United States Patent [19]
Sardo

[11] Patent Number: 5,775,475
[45] Date of Patent: Jul. 7, 1998

[54] DEVICE FOR TRANSPORTING PRODUCTS, SUCH AS FRUIT AND VEGETABLES IN A STATION FOR SORTING THEM

[75] Inventor: Alberto Sardo, Chateaurenard, France

[73] Assignee: Xeda International, Saint-Audiol, France

[21] Appl. No.: 621,310

[22] Filed: Mar. 25, 1996

[30] Foreign Application Priority Data

Mar. 23, 1995 [FR] France .................. 95 03441

[51] Int. Cl.$^6$ .................................................. B65G 47/38
[52] U.S. Cl. ................. 198/370.04; 209/652; 209/912
[58] Field of Search ................... 198/370.04; 209/652, 209/912

[56] References Cited

U.S. PATENT DOCUMENTS

| | | | |
|---|---|---|---|
| 3,662,874 | 5/1972 | Muller | 198/370.04 |
| 4,031,998 | 6/1977 | Suzuki et al. | 198/370.04 |
| 4,586,613 | 5/1986 | Horii | 198/370.04 X |
| 4,961,489 | 10/1990 | Warkentin | 198/370.04 |

FOREIGN PATENT DOCUMENTS

| | | |
|---|---|---|
| 2 304 413 | 10/1976 | France. |
| 2681800 | 4/1993 | France. |
| 33 29 378 | 2/1985 | Germany. |

*Primary Examiner*—Janice L. Krizek
*Attorney, Agent, or Firm*—Wenderoth, Lind & Ponack, L.L.P.

[57] ABSTRACT

This device includes a conveyor chain on which are fixed support members for supporting products, such members being between positions for transporting the products in the station and for removing the products from the device, under the control of a sorting control. Each support member includes a lever joined, by an articulation joint, to a support stem fixed to the chain and including, on one side of the articulation joint, fingers for supporting the products, and on the other side of the articulation joint, an operating portion designed to interact with the sorting control to control the movements of the lever between the transport and removal positions.

11 Claims, 2 Drawing Sheets

DEVICE FOR TRANSPORTING PRODUCTS, SUCH AS FRUIT AND VEGETABLES IN A STATION FOR SORTING THEM

BACKGROUND OF THE INVENTION

The present invention relates to a device for transporting products such as fruit and vegetables in a station for sorting them.

A number of devices of this type for transporting products are already known, and these include a conveyor chain to which are fixed members for supporting the products, which can move between a first position for transporting the products in the station and a second position for removing the products from the device. The conveyor chain is under the control of a means for controlling the sorting of the products.

These transport devices are, for example, built into product-packaging lines equipped, for example, with means for grading the products by weight or optically or with other means of analyzing them.

It will therefore be appreciated that, in these lines, the products pass first of all through the analysis station, in which they are, for example, weighed or analyzed in some other way, then into the sorting station in which the products are removed from the transport device by sorting conducted using data delivered by the analysis station.

Document FR-A-2,681,800 in the name of the assignee company already describes an apparatus for the automatic grading, on a weight basis, particularly of fruit, and which includes a weighing chain provided with elements for supporting the fruit and able to move with respect to a set of scales between a supply station and a removal station.

In this apparatus, the elements for supporting the fruit comprise fingers for accommodating the fruit to be graded, and two successive support elements presenting the scales with an item of fruit to be graded. Each support element is joined in an articulated manner to the weighing chain at its end opposite to the fingers and vertically in line with these fingers including a heel for resting on at least one guide stretching along the weighing chain or on the scales. The guide is provided with a gap in which the scales are placed.

Other documents describe the use of chain-type or roller-type conveyors for transporting products to a grading station.

Once weighed, the products are then transferred to a device for transporting them to the sorting station.

In general, the transport devices built into these sorting stations comprise a conveyor chain to which are fixed members for supporting the products, such as buckets or the like for example, which can move between a first position for transporting the products in the station and a second position for removing the products from the device, under the control of a means for controlling the sorting of the products.

Thus, for example, these control means include means for tipping the buckets or the like, for example, in order to remove the products from the device.

It will, however, be appreciated that these devices display a certain number of drawbacks, especially as regards the transferring of products between the analysis station and the sorting station.

In addition, the structure of the transport devices used at the sorting station is relatively complicated and therefore expensive to produce.

Finally, these transport devices are not very or not at all suited to the transporting of products of elongate shape.

The object of the invention is therefore to solve these problems.

SUMMARY OF THE INVENTION

To this end, the subject of the invention is a device for transporting products, such as fruit and vegetables, in a station for sorting them, of the type including a conveyor chain to which are fixed members for supporting the products. The supporting members can move between a first position for transporting the products in the station and a second position for removing the products from the device, under the control of a means for controlling the sorting of the products. Each support member includes a lever, an intermediate portion of which includes an articulation joint for joining the lever to one end of a support stem, the other end of which is fixed to the conveyor chain. On one side of the articulation joint of the lever, fingers are provided for supporting the products and extend more or less parallel to the axis of the chain. On the other side of the articulation joint is provided an operating means designed to interact with a sorting control means for controlling the movements of the lever between the first position for transport and the second position for removing the products, by pivoting about the axis of the articulating joint for joining the lever to the stem.

BRIEF DESCRIPTION OF THE DRAWINGS

The invention will be better understood from reading the description which will follow, given merely by way of example and made with reference to the attached drawings, in which.

DETAILED DESCRIPTION OF THE INVENTION

Figure 1:
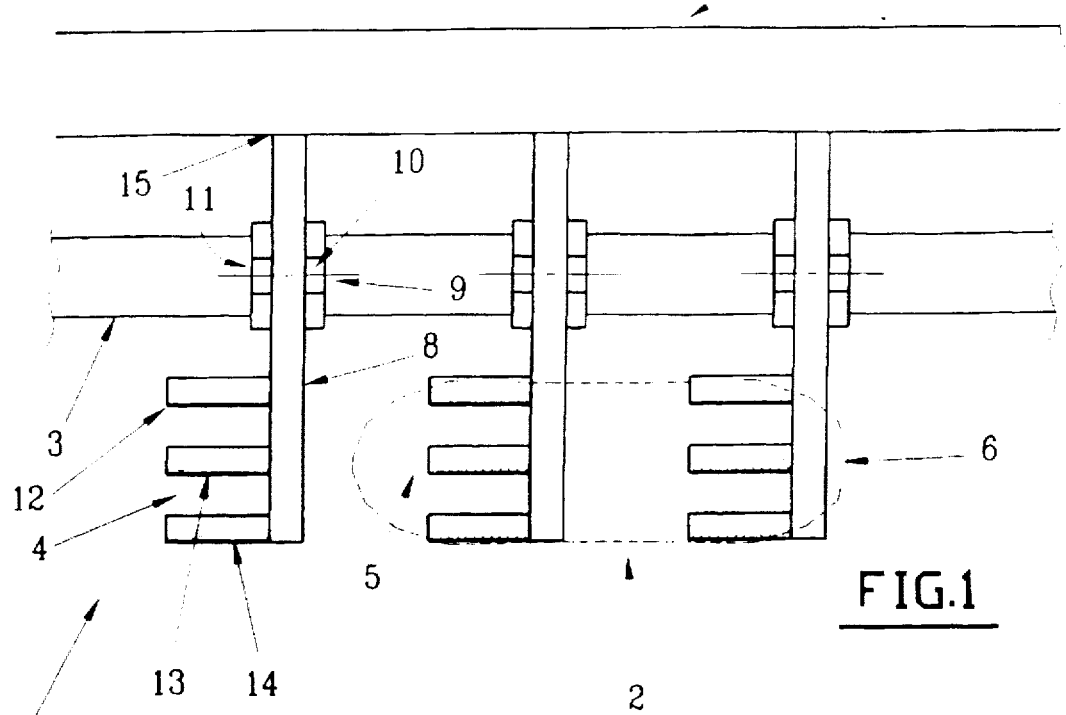
FIG. 1 represents a view from above of one embodiment of a device for transporting products according to the invention.

Represented in FIG. 1 is a device for transporting products such as fruit and vegetables in a station for sorting them.

This device is denoted by the reference numeral 1 in this figure and allows the transportation of products such as fruit and vegetables, for example of elongate shape, one of which is represented in phantom line in this figure and denoted by the reference numeral 2.

In the conventional fashion, this transport device includes a conveyor chain 3, on which there are fixed members for supporting the products, three of which members are represented in this FIG. 1 and denoted by the reference numerals 4, 5 and 6.

Also in the conventional fashion, these members for supporting the products can move between a first position for transporting products in the station and a second position for removing them from the device, under the control of a means for controlling the sorting of the products.

In the embodiment represented in this FIG. 1, the control means is, for example, formed of a member in the form of a guide 7 and arranged along the conveyor chain 3.

Figure 2:
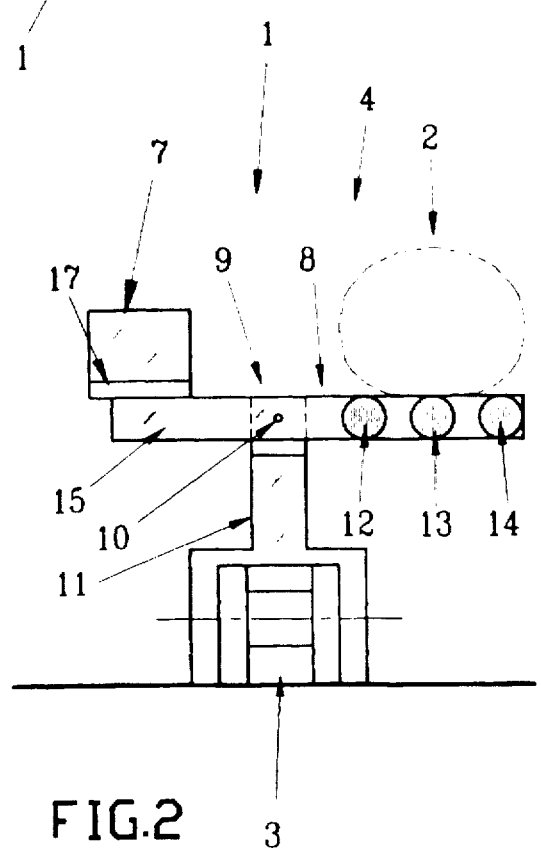
FIG. 2 represents a side view of a member for supporting products forming part of the construction of the transport device represented in FIG. 1, this member being illustrated in its first position for transporting the products.
Figure 3:
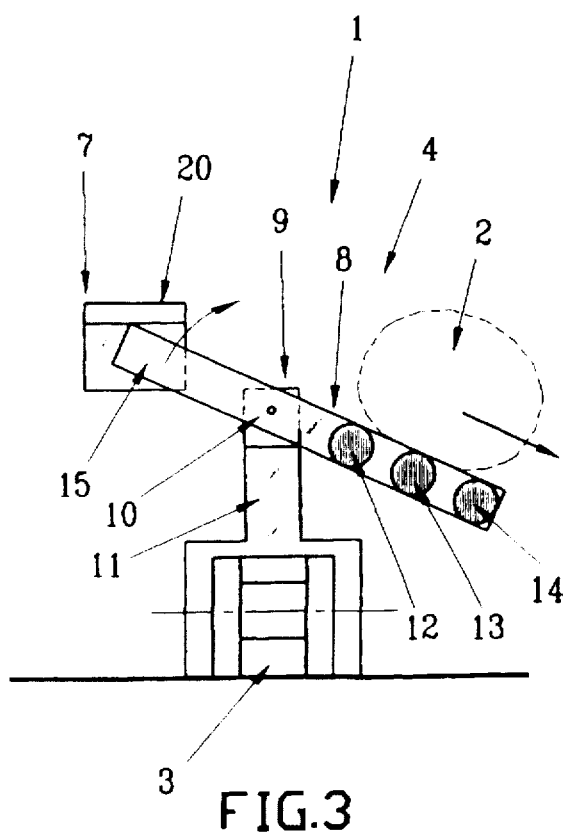
FIG. 3 represents a view similar to that of FIG. 2, illustrating the support member in its second position for removing the products.

According to the invention, and as more specifically visible in FIGS. 2 and 3, each support member includes a lever 8, stretching for example above the chain 3 more or less perpendicular to the axis thereof, and of which an intermediate portion 9 includes means 10 for articulation to one end of a vertical support stem 11, the other end of which is fixed to the conveyor chain 3.

This lever 8 includes, on one side of the articulation means 10, fingers for supporting the products extending more or less parallel to the axis of the chain as is clear from FIGS. 1, 2 and 3.

Indeed, in these figures, this side of the lever 8 has three fingers 12, 13 and 14 stretching more or less parallel to the axis of the chain to allow the transport device to transport products, for example of elongate shape, such as cucumbers, carrots or the like.

It will thus be appreciated that in the case products of elongate shape, such products rest on two or more successive support members of the chain 3.

On the other side of the articulation means 10, the lever 8 includes operating means 15 designed to interact with the sorting control means 7 and formed, for example, by the member in the form of a guide which will be described in greater detail later, for controlling the movements of the lever 8 between the first position of transport represented in FIG. 2, in which position the products rest on the fingers 12, 13 and 14 of the lever, and the second position for removal of the products, reached by pivoting of the lever 8 about the axis of the means 10 for pivotally attaching this lever 8 to the support stem 11, as may be seen in FIG. 3.

The corresponding end of the stem 11 for supporting the lever 8 may be fixed to the chain 3 using any suitable means known in the art.

In the embodiment represented, this stem 11 includes, at the end which is fixed to the chain, for example two branches forming a fork arranged about the chain 3 in order to fix each member to this chain.

Figure 4:
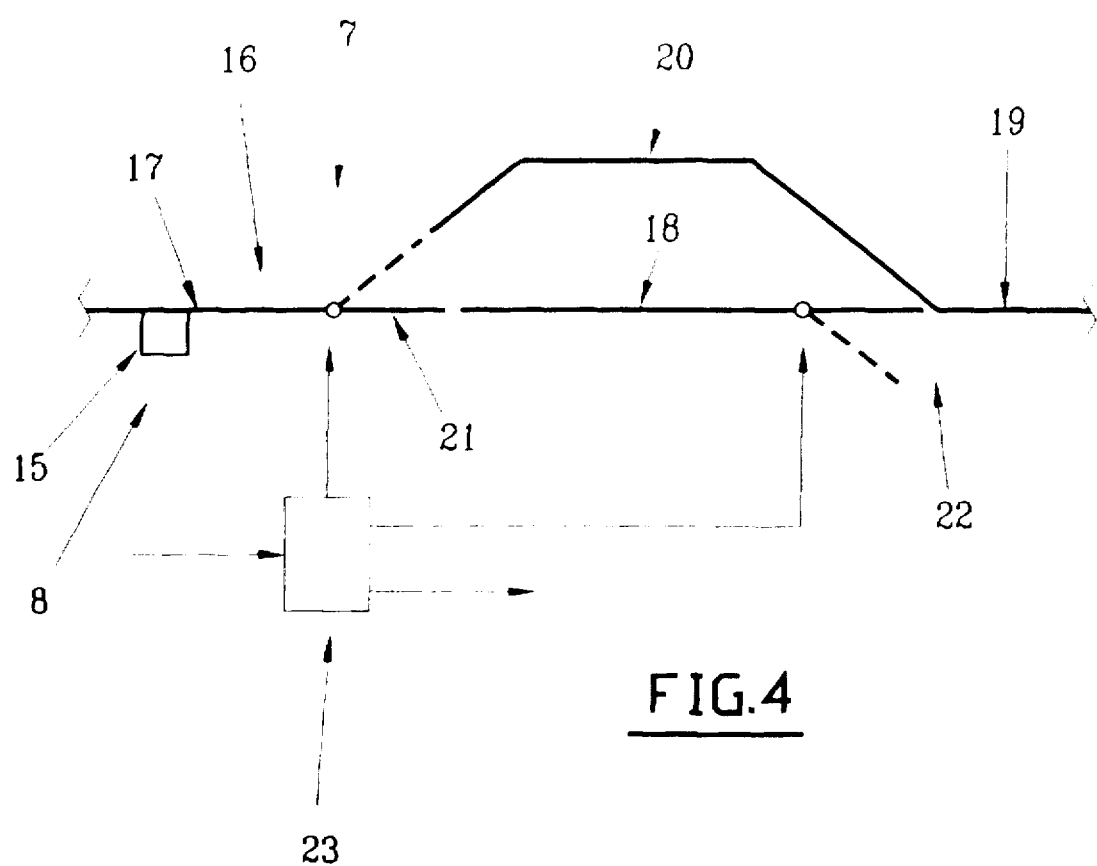
FIG. 4 diagrammatically represents one embodiment of a sorting control means forming part of the construction of a transport device according to the invention.

Represented in FIG. 4 is one embodiment of a means for controlling the sorting of the products.

As was described with reference to the previous figures, the lever 8 at one of its ends includes the operating means 15 designed to interact with the control means in order to transport products into the sorting station or remove them from the device.

This removal may, for example, be controlled on the basis of the grades or of data relating to an optical Analysis, for example, of the products in order to remove the products, for example, in stations for receiving them spread out along the transport device on the basis of the sorting carried out, in the conventional fashion.

In this case, the control means 7 may include a member in the form of a guide 16 shown in FIG. 4. This guide includes, for example, first portions 17, 18 and 19 for keeping the lever 8 in its first position for transporting the products, and second portions 20 forming branched-off paths and allowing the lever 8 to move from its first position for transporting into its second position for removing the products by pivoting about the axis of the means 10 by which this lever 8 is pivotally attached to the support stem 11.

In this case, the guide 16 includes, at the intersections between its various portions, means forming routing gear, for example 21 and 22, driven by a central data-processing unit 23 receiving data, for example, from an analysis station associated with the product transport device according to the invention, for correctly sorting the products.

It will be appreciated that, on the basis of data delivered, for example, by this analysis station, the central data-processing unit 23 makes the routing gear 21 and 22 open or close to allow or not allow the lever 8, and more particularly the operating means 15 at one of the ends of the lever 8, to follow the corresponding branched-off path of the member in the form of a guide, in order to allow the lever to tilt and thus remove the corresponding product to the corresponding receiving station.

Of course it goes without saying that means similar to those represented in FIG. 4 are provided facing each station for receiving the products, in order to sort these fully.

It also goes without saying that various embodiments of these sorting control means may be envisaged.

Thus, for example, it will be appreciated that when an elongate product is arranged on several support members of the transport device according to the invention, a sensor may, for example, be placed at the entry thereof to determine the length of the product and also deliver to the central unit data for controlling the operation of the routing gear to allow the passage of a corresponding number of support members down the branched-off path of the guide in order to remove the product from the transport device through the controlled pivoting of the support members on which this product is lying.

The transport device which has just been described may be combined with various types of grading stations or stations for the optical analysis of the products in order to sort them.

Such grading stations may, of course, have any structure whatever of transport devices such as those with successive support members with rollers or conveyor chains as mentioned earlier.

I claim:

1. A device for transporting products via a conveyor chain in a station for sorting the products, said device comprising:

a support stem having a first end for fixing to the conveyor chain, and a second end;

a lever having a first end portion, a second end portion and an intermediate portion between said first end portion and said second end portion;

support fingers provided on said first end portion of said lever to support the products;

wherein an operating part is provided at said second end portion of said lever;

wherein said lever is pivotally joined, at said intermediate portion thereof, to said second end of said support stem by an articulation joint such that said lever is pivotable between a first position for transporting the products in the station and a second position for removing the products from said device; and wherein a sorting control device is operably disposed for interacting with said operating part to control movements of said lever between said first and second positions by allowing said lever to pivot, due to gravity, from said first position to said second position at at least one predetermined location along a path of the conveyor chain.

2. A device as recited in claim 1, wherein said lever extends in a direction generally perpendicular to the path of the conveyor chain.

3. A device as recited in claim 1, wherein said sorting control device comprises a guide disposed for interaction with said operating part and comprising first portions for maintaining said lever in said first position and at least one second portion forming a branched off path for selectively allowing said lever to move into said second position.

4. A device as recited in claim 3, wherein said guide further includes a routing member connecting said at least one second portion of said guide to said first portions of said guide, and a central processing unit for processing sorting data and driving said routing member.

5. A device as recited in claim 4, wherein said lever extends in a direction generally perpendicular to the path of the conveyor chain.

6. A device for transporting products in a station for sorting the products, said device comprising:

an elongated conveyor member;

a plurality of support stems each having a first end fixed to said conveyor member, and a second end;

a plurality of levers each having a first end portion, a second end portion and an intermediate portion between said first end portion and said second end portion;

support fingers provided on said first end portion of each of said levers to support the products;

wherein operating parts are respectively provided at said second end portions of said levers;

wherein each of said levers is pivotally joined, at said intermediate portion thereof, to said second end of a respective one of said support stems by an articulation joint such that said lever is pivotable between a first position for transporting the products in the station and a second position for removing the products from said device; and wherein a sorting control device is operably disposed for interacting with said operating parts to control movements of said levers between said first and second positions by allowing said levers to pivot, due to gravity, from said first position to said second position at at least one predetermined location along a path of said conveyor member.

7. A device as recited in claim 6, wherein said levers extend in a direction generally perpendicular to the path of said conveyor member, and said fingers extend in a direction generally parallel to the path of said conveyor member.

8. A device as recited in claim 6, wherein wherein said conveyor member comprises a conveyor chain.

9. A device as recited in claim 6, wherein said sorting control device comprises a guide disposed for interaction with said operating parts and comprising first portions for maintaining said levers in said first position and at least one second portion forming a branched off path for selectively allowing said levers to move into said second position.

10. A device as recited in claim 9, wherein said guide further includes a routing member connecting said at least one second portion of said guide to said first portions of said guide, and a central processing unit for processing sorting data and driving said routing member.

11. A device as recited in claim 10, wherein said levers extend in a direction generally perpendicular to the path of said conveyor member, and said fingers extend in a direction generally parallel to the path of said conveyor member.

* * * * *